(12) United States Patent
Arthur et al.

(10) Patent No.: US 11,201,333 B2
(45) Date of Patent: Dec. 14, 2021

(54) ELECTRO-POLYMERIZED PROTECTIVE LAYER FOR 3D MAGNESIUM BATTERY

(71) Applicant: Toyota Motor Engineering & Manufacturing North America, Inc., Plano, TX (US)

(72) Inventors: Timothy S. Arthur, Ann Arbor, MI (US); Nikhilendra Singh, Ypsilanti, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 50 days.

(21) Appl. No.: 16/708,884

(22) Filed: Dec. 10, 2019

(65) Prior Publication Data

US 2020/0112028 A1    Apr. 9, 2020

Related U.S. Application Data

(62) Division of application No. 16/111,366, filed on Aug. 24, 2018, now Pat. No. 10,541,419.

(51) Int. Cl.
| | |
|---|---|
| *H01M 4/13* | (2010.01) |
| *H01M 4/62* | (2006.01) |
| *H01M 4/80* | (2006.01) |
| *H01M 4/36* | (2006.01) |

(Continued)

(52) U.S. Cl.
CPC ......... *H01M 4/628* (2013.01); *H01M 4/0466* (2013.01); *H01M 4/134* (2013.01);
(Continued)

(58) Field of Classification Search
CPC ...... H01M 4/628; H01M 4/62; H01M 4/0466; H01M 4/134; H01M 4/1395; H01M 4/366;
(Continued)

(56) References Cited

U.S. PATENT DOCUMENTS

| | | | |
|---|---|---|---|
| 3,036,141 | A | 5/1962 | Goldenberg et al. |
| 2005/0095504 | A1 | 5/2005 | Kim et al. |

(Continued)

FOREIGN PATENT DOCUMENTS

| | | |
|---|---|---|
| CN | 1612377 A | 5/2005 |
| CN | 101499528 A | 8/2009 |

(Continued)

OTHER PUBLICATIONS

Arthur, T.S. et al., "Three-dimensional electrodes and battery architectures," MRS Bulletin, vol. 36, pp. 523-531 (2011).

*Primary Examiner* — Raymond Alejandro
(74) *Attorney, Agent, or Firm* — Christopher G. Darrow; Darrow Mustafa PC

(57) ABSTRACT

Methods for forming polymeric protective layers on magnesium anodes for magnesium batteries include placing a solution of electropolymerizable monomers onto all exposed surfaces of a magnesium anode, and electropolymerizing the monomers in the solution. The monomers can be glycidyl methacrylate, a salt of 3-sulfopropyl methacrylate, or a mixture of the two. Protected magnesium foam anodes for 3-D magnesium batteries have a magnesium foam electrolyte, and a polymeric coating covering all exposed surfaces of the magnesium foam electrolyte. The polymeric protective coating formed of (poly)glycidyl methacrylate, poly(3-sulfopropyl methacrylate), or a copolymer of the two.

6 Claims, 7 Drawing Sheets

(51) Int. Cl.
*H01M 4/38* (2006.01)
*H01M 4/04* (2006.01)
*H01M 4/1395* (2010.01)
*H01M 4/134* (2010.01)
*H01M 10/054* (2010.01)
*H01M 4/66* (2006.01)
*H01M 4/02* (2006.01)

(52) U.S. Cl.
CPC ......... *H01M 4/1395* (2013.01); *H01M 4/366* (2013.01); *H01M 4/381* (2013.01); *H01M 4/661* (2013.01); *H01M 4/808* (2013.01); *H01M 10/054* (2013.01); *H01M 2004/027* (2013.01)

(58) Field of Classification Search
CPC ...... H01M 4/362; H01M 4/381; H01M 4/661; H01M 4/66; H01M 4/64; H01M 4/808; H01M 4/80; H01M 10/054; H01M 2004/027; H01M 2004/021
See application file for complete search history.

(56) References Cited

U.S. PATENT DOCUMENTS

| | | | |
|---|---|---|---|
| 2011/0059385 A1 | 3/2011 | Kim et al. | |
| 2013/0209878 A1* | 8/2013 | Nakahara | H01M 4/661 |
| | | | 429/211 |
| 2014/0087235 A1* | 3/2014 | Kajitani | H01M 2/026 |
| | | | 429/149 |
| 2014/0173889 A1 | 6/2014 | Johnson et al. | |
| 2015/0041708 A1 | 2/2015 | Wiesner et al. | |
| 2015/0072244 A1* | 3/2015 | Chen | H01M 4/622 |
| | | | 429/303 |
| 2017/0062840 A1 | 3/2017 | Wu | |
| 2017/0104204 A1 | 4/2017 | Zhamu | |
| 2017/0324097 A1 | 11/2017 | Lee et al. | |
| 2017/0352869 A1* | 12/2017 | Zhamu | H01M 4/133 |
| 2018/0062176 A1 | 3/2018 | Liao et al. | |
| 2018/0269479 A1* | 9/2018 | Zhamu | H01M 4/133 |
| 2019/0097260 A1* | 3/2019 | Mizuno | H01M 4/62 |
| 2020/0264663 A1* | 8/2020 | Kumta | G06F 1/1635 |

FOREIGN PATENT DOCUMENTS

| | | |
|---|---|---|
| CN | 101997107 A | 3/2011 |
| CN | 102020753 A | 4/2011 |
| CN | 103563130 A | 2/2014 |
| CN | 105789695 A | 7/2016 |
| CN | 107123788 A | 9/2017 |
| JP | 2003007337 A | 1/2003 |
| JP | 2011249175 A | 12/2011 |
| JP | 2013084351 A | 5/2013 |
| JP | 2014175055 A | 9/2014 |
| JP | 2014529876 A | 11/2014 |

* cited by examiner

ELECTRO-POLYMERIZED PROTECTIVE LAYER FOR 3D MAGNESIUM BATTERY

CROSS-REFERENCE TO RELATED APPLICATIONS

This application is a divisional of U.S. patent application Ser. No. 16/111,366, which was filed Aug. 24, 2018, now U.S. Pat. No. 10,541,419, and which is herein incorporated by reference in its entirety.

TECHNICAL FIELD

The present disclosure generally relates to protective coatings for magnesium anodes and, more particularly, to protective coatings for magnesium foam anodes in 3-dimensional magnesium batteries.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Battery performance can be improved by formation of a protective coating on the anode. Such as protective coating can prevent short circuits, thereby improving battery stability and extending the effective lifetime of the battery. In many instances, such protective coatings are formed during cell cycling, such as a solid electrolyte interphase (SEI) in which components of electrolyte and anode combine at the anode surface to form a protective coating on the anode. However, because ionic conductivity in an SEI is essential, SEI formation can limit certain electrolyte/anode combinations. Also, because SEI's are conventionally formed in situ, during cell operation, verification of an adequate protective coating can be uncertain.

Three-dimensional battery architectures, in which cathode surrounds anode in all directions, and/or impregnates a porous cathode, can eliminate "dead space" from a cell and improve energy density and power density. However, these architectures tend, by design, to place cathode and anode in very close proximity, sometimes in intricate and morphologically heterogeneous ways, as in the example of a cathode material impregnated into pores of a heterogeneously porous anode. In such applications, it may be desirable to form a reliable protective coating of known ionic conductivity on the anode prior to cell assembly. Accordingly, it would be desirable to develop pre-formed protective coatings for 3-D magnesium anodes, and methods for preparing them.

SUMMARY

This section provides a general summary of the disclosure, and is not a comprehensive disclosure of its full scope or all of its features.

In various aspects, the present teachings provide a protected foam magnesium anode. The protected magnesium includes a magnesium foam anode and a polymeric layer contacting the magnesium foam anode on substantially all exposed surfaces. The polymeric layer is formed of polyglycidyl methacrylate, poly(3-sulfopropyl methacrylate), or a glycidyl methacrylate/3-sulfopropyl methacrylate copolymer.

In other aspects, the present teachings provide a method for protecting a magnesium anode. The method includes a step of contacting all exposed surfaces of the magnesium anode with a monomer solution. The monomer solution contains at least one polymer that includes glycidyl methacrylate (GMA), a salt of 3-sulfopropyl methacrylate (SPA), or a combination of the two. The method further includes a step of electropolymerizing the at least one monomer in the monomer solution, thereby forming a polymeric protective layer on all exposed surfaces of the magnesium anode.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide polymeric protective layers for magnesium anodes having low electric conductivity and high magnesium ion conductivity, as well as methods for forming protected magnesium anodes. The protective layers are easily formed on magnesium anode surfaces prior to cell assembly and can prevent short circuits in an assembled cell. Protective layers of the present teachings can be particularly useful in the context of three dimensional magnesium cells.

Protected 3-D magnesium anodes of the present teachings have particular 3-D architectures designed to be surrounded in three dimensions by cathode, and are coated with a protective electro-polymer layer, particularly including polymers of certain esterified methacrylates. Methods for making such protected anodes include coating the anode with a monomer solution and electro-polymerizing the monomer(s).

Figure 1:
FIG. 1 is a perspective view of a magnesium foam anode.

FIG. 1 shows a perspective view of an exemplary three-dimensional (3-D) magnesium anode, a magnesium foam anode 100. The magnesium foam anode 100 of FIG. 1 has a branched magnesium structure with tendrils of elemental magnesium 110 interspersed with pores 120. It has an open cell porous structure so that all of the pores are interconnected. The magnesium foam anode 100 can be formed entirely of magnesium, or can have magnesium plated on an underlying substrate, such as by electroplating or vapor deposition.

A magnesium foam is a structure that is porous in three dimensions, typically with porosity greater than 0.5 and average pore size less than 1 mm, and that is composed of magnesium metal, or at least surface coated with magnesium metal, when at least partially charged. In different implementations, porosity of the magnesium foam will be greater than 0.6, or 0.7, or 0.8, or 0.9. In some implementations, average pore size in the magnesium foam will be less than 900 μm, or less than 800 μm, or less than 700 μm, or less than 600 μm, or less than 500 μm, or less than 400 μm. In various implementations, a magnesium foam can be made by 3-D printing (i.e. CAD-directed additive fabrication), or by electroplating magnesium on to a suitable substrate, such as copper foam. In certain specific implementations, discussed in detail below, a magnesium foam can be made by pulsed electrodeposition of magnesium onto copper foam.

A protected magnesium anode of the present teachings has a polymeric layer coating all exposed surfaces. The polymeric layer is formed of an electropolymerizable monomer or mixture of monomers. In certain implementations, the polymeric layer can include a polymer or co-polymer of a methacrylic acid ester, including, without limitation poly (glycidyl methacrylate) and poly(3-sulfopropyl methacrylate).

Figure 2A:
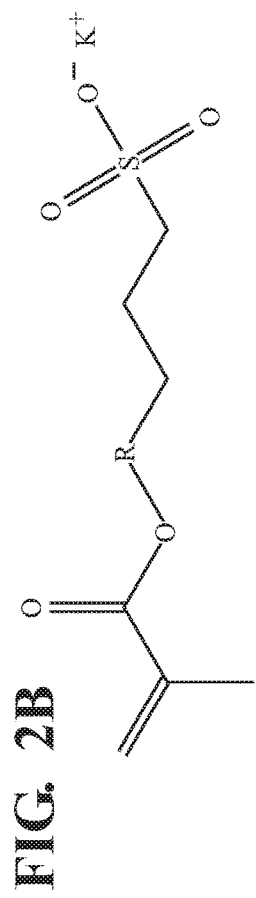
FIGS. 2A and 2B are line drawings of glycidyl methacrylate (GMA) and potassium (3-sulfopropyl methacrylate) (KSPA), respectively.
Figure 2B:
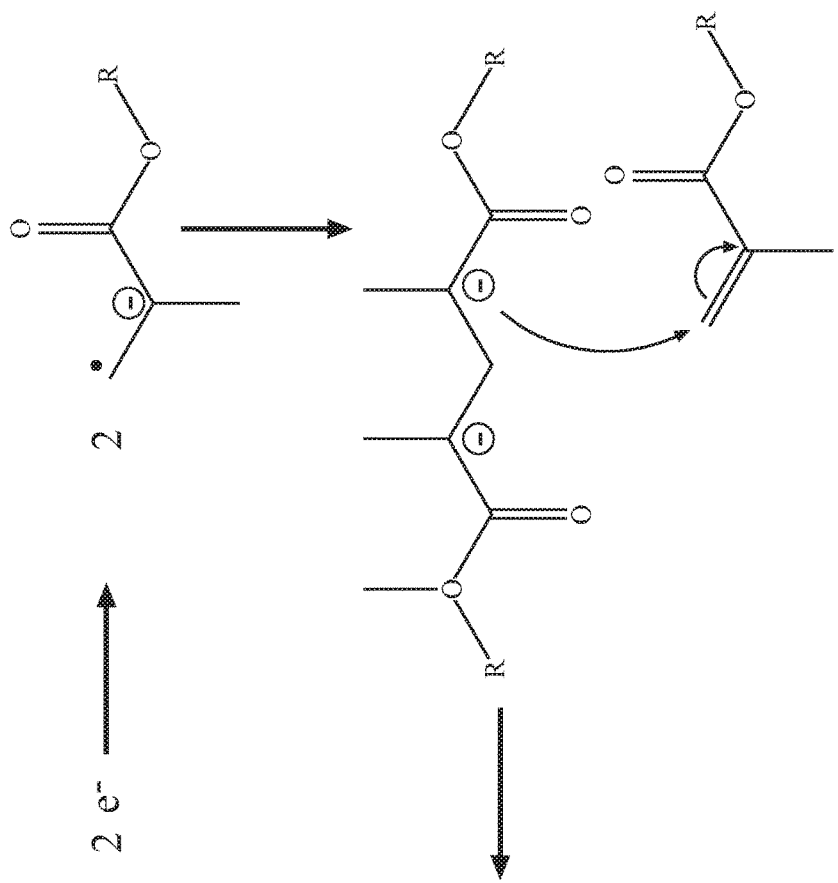
Figure 2C:
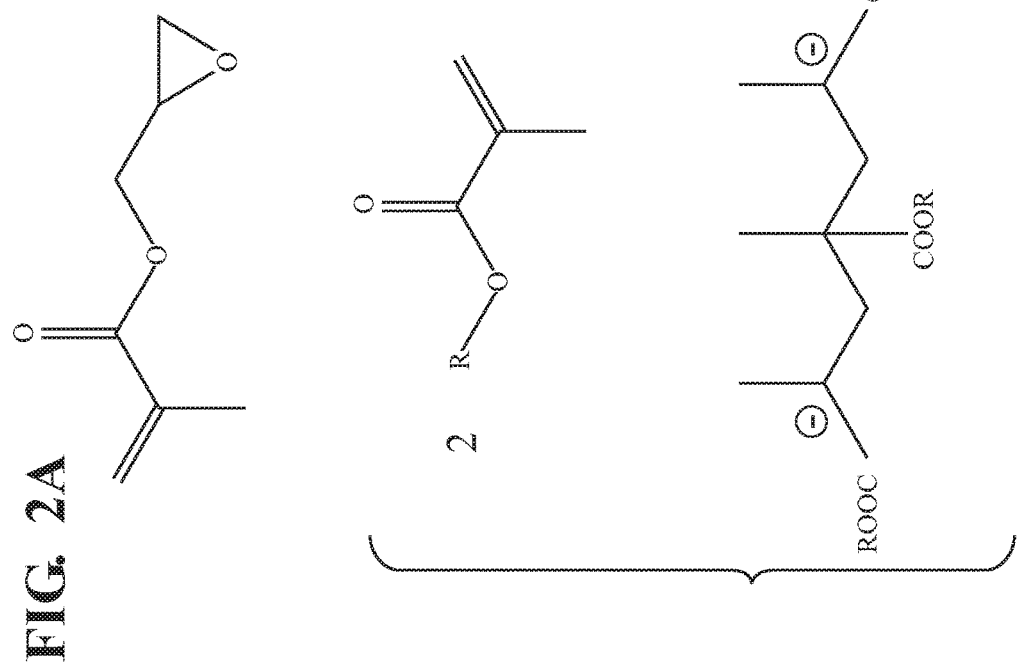
FIG. 2C is a line drawing showing a mechanism of electropolymerization of an esterified methacrylate of FIGS. 2A and 2B.

For reference, FIGS. 2A and 2B show line drawings of glycidyl methacrylate (GMA) and potassium (3-sulfopropyl methacrylate) (KSPA), respectively. FIG. 2C shows a line drawing of the electropolymerization reaction of a generic methacrylate ester, such as GMA or KSPA.

Figure 3A:
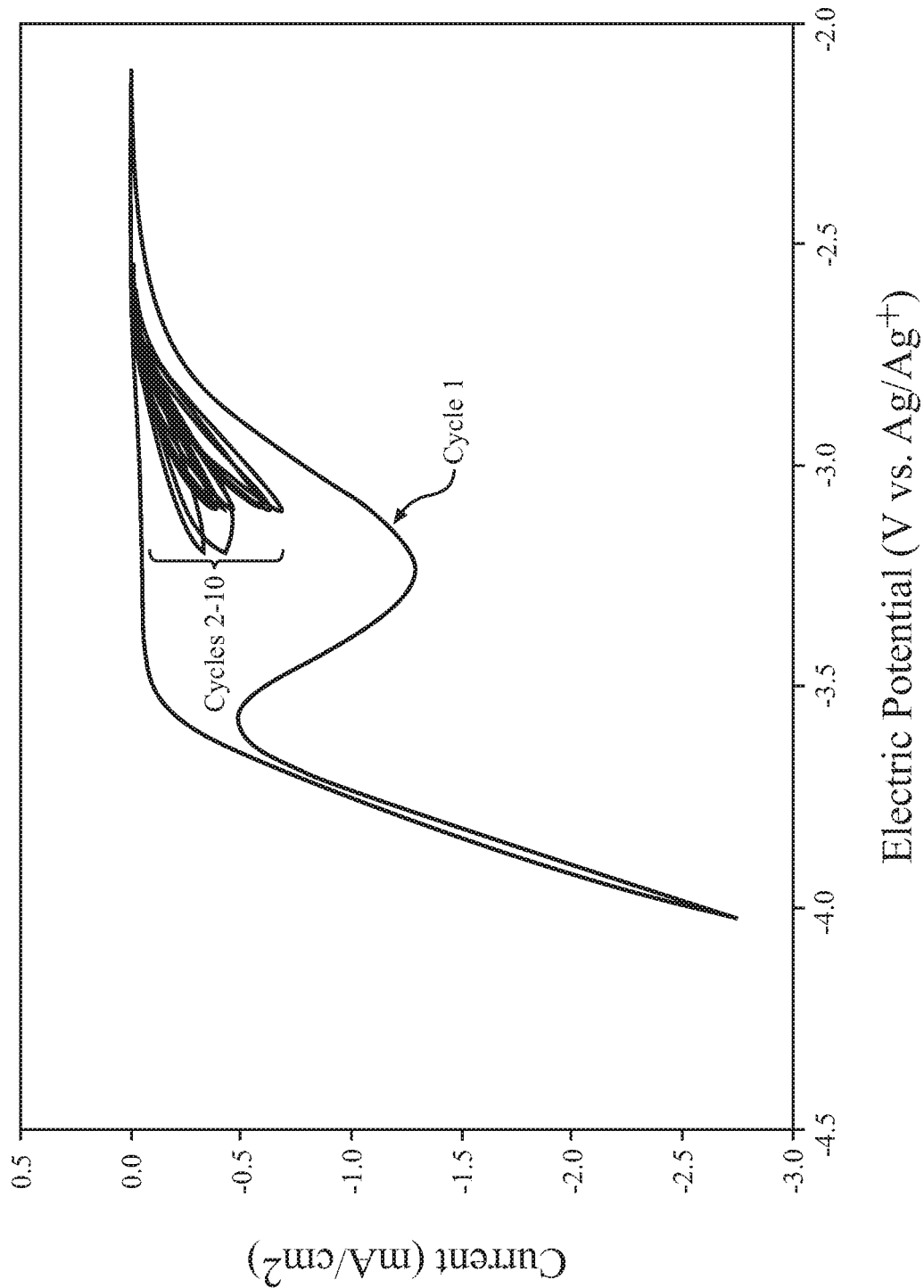
FIGS. 3A and 3B are cyclic voltammograms showing 10 cycles of electrochemical polymerization of GMA and KSPA, respectively.
Figure 3B:
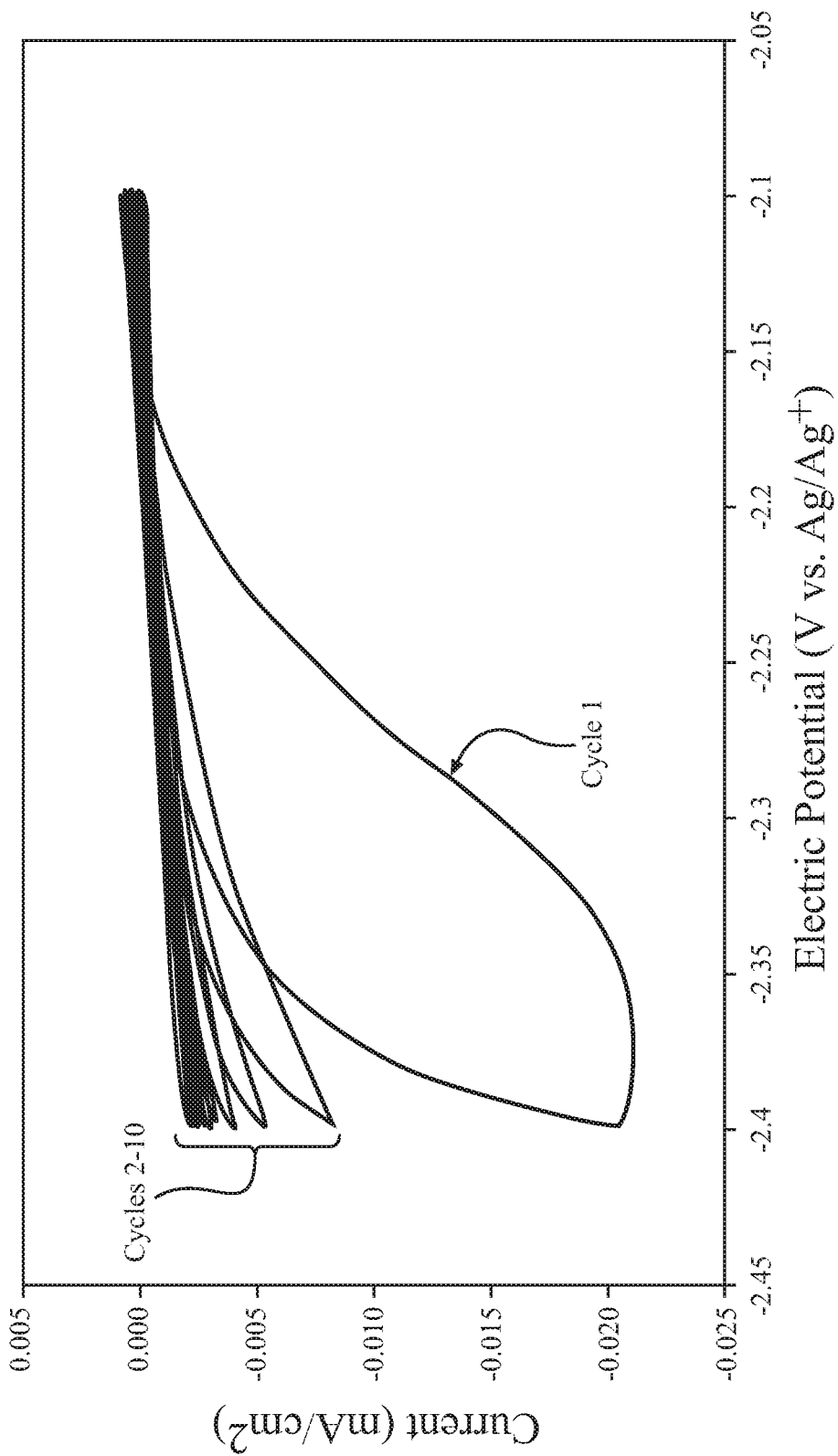

FIG. 3A shows cyclic voltammograms, for ten cycles, of electropolymerization of GMA onto a magnesium anode. FIG. 3B shows the analogous data for electropolymerization of KSPA onto a magnesium anode. It will be understood that the first cycle is run across a wide electric potential window in order to find the maximum current for initiating the polymerization. In general, it will be desirable to avoid performing electropolymerization across an electric potential window greater than this, in order to avoid diffusion limitations. For simplicity of cell assembly, and to demonstrate electropolymerization conditions, the anode on which polymer is electropolymerized in FIGS. 3A and 3B is magnesium foil. It will be understood that this procedure can be performed under comparable conditions with a magnesium foam anode or any other magnesium anode structure, however.

Figure 4A:
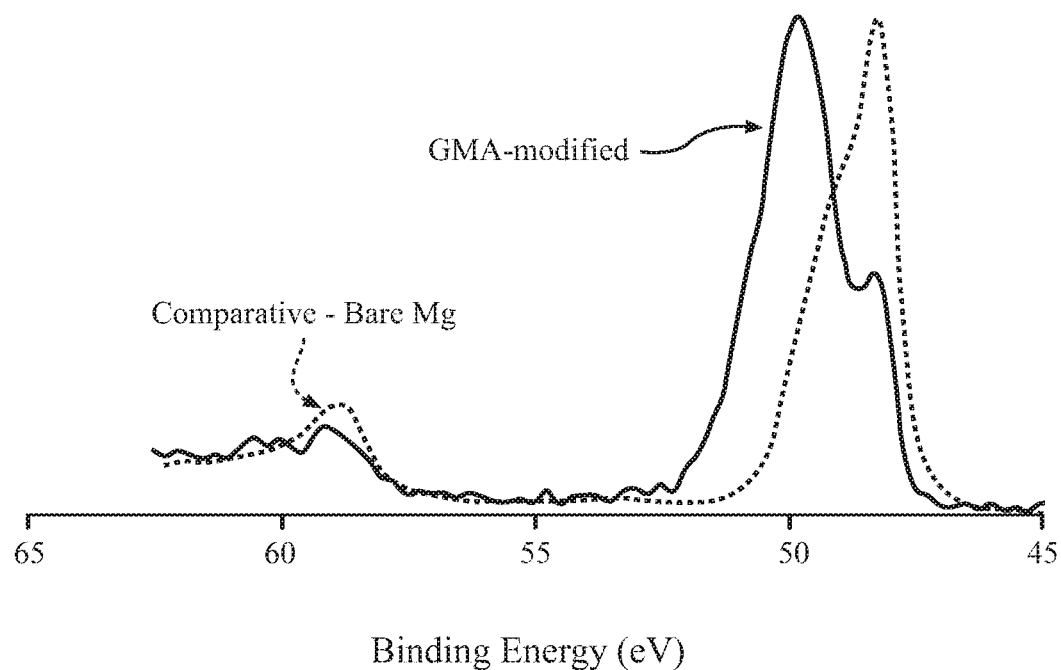
FIG. 4A is an x-ray photoelectron spectroscopy (XPS) spectrum, in the Mg 2p region of an unprotected magnesium foam anode and of the anode with an electropolymerized GMA surface layer.

FIG. 4A shows x-ray photoelectron spectroscopy (XPS) spectra, in the magnesium 2p region, of the magnesium anode of FIG. 3A after ten cycles of GMA electropolymerization (solid line), and of an otherwise equivalent magnesium anode having no protective layer (dotted line). Given that a magnesium peak, centered at about 48 eV, is still evident in the XPS spectrum of the protected anode, these results suggest that GMA polymerization did not occur uniformly across all exposed surfaces of the anode, and that unprotected portions of the anode remain. This result suggests that it may be difficult to obtain complete surface coverage of the magnesium anode when using an electropolymerization solution having GMA as the sole monomer.

Figure 4B:
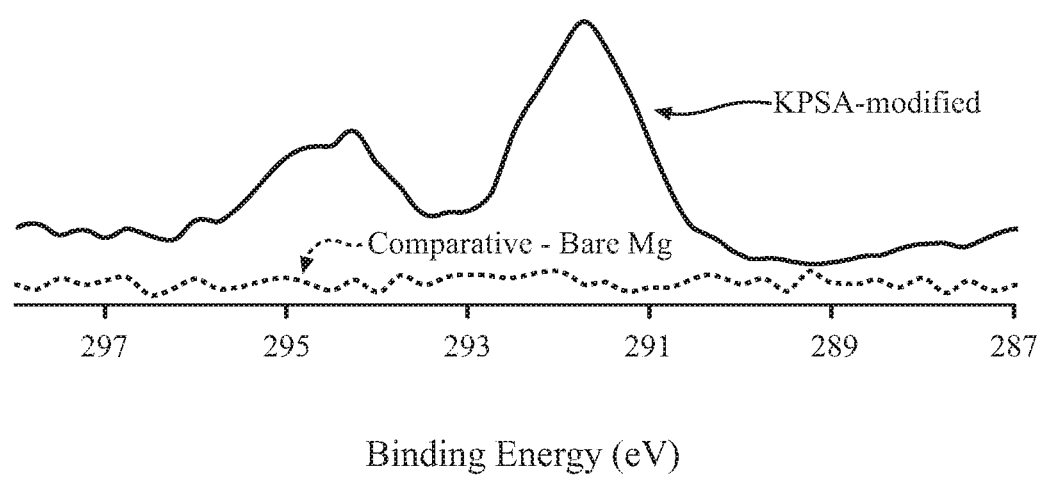
FIG. 4B is an XPS spectrum, in the potassium 2p region of an unprotected magnesium foam anode and of the anode with an electropolymerized KSPA surface layer.
Figure 4C:
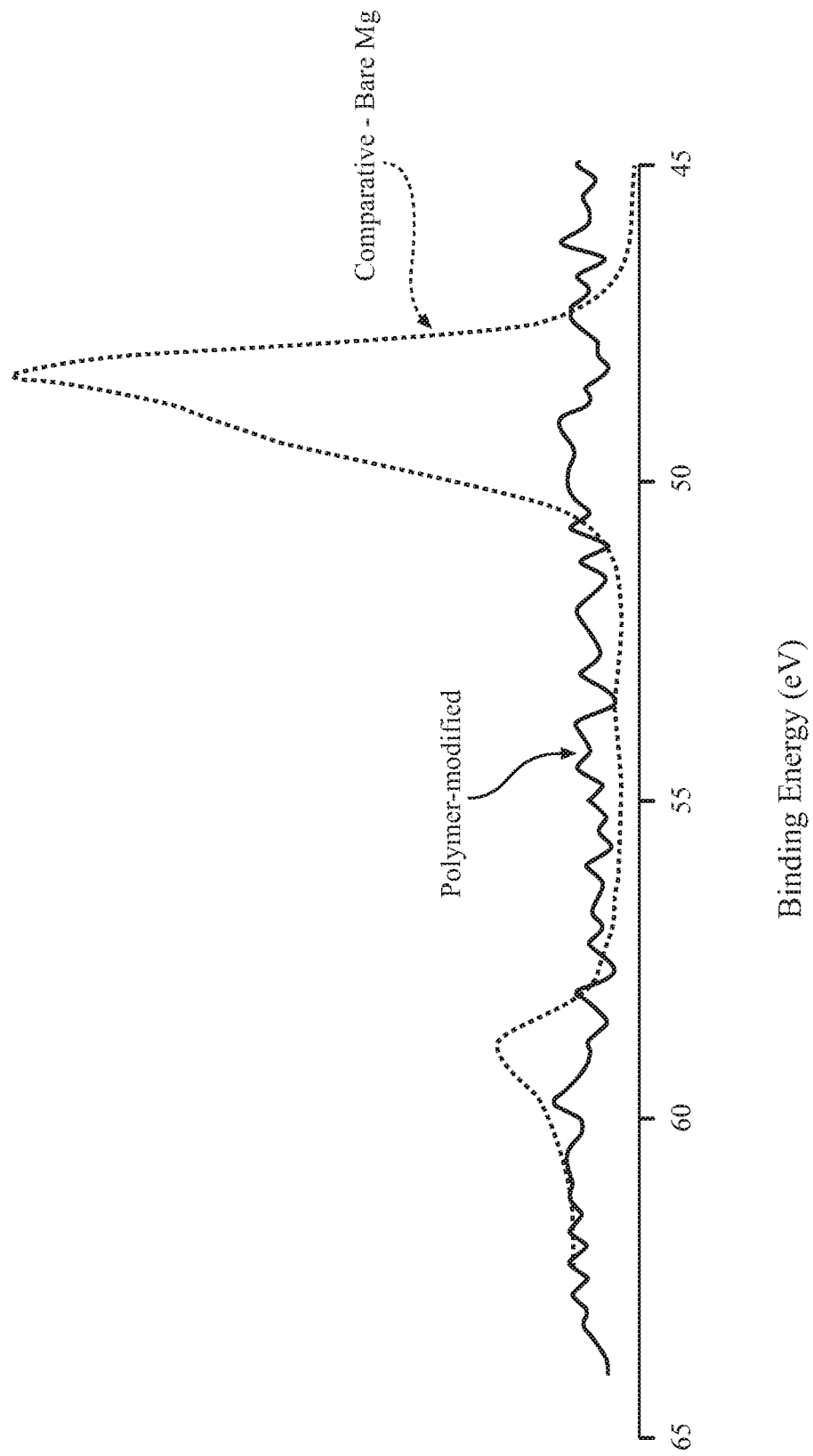
FIG. 4C an XPS spectrum, in the Mg 2p region of an unprotected magnesium foam anode and of the anode with an electropolymerized KSPA surface layer.

FIG. 4B show XPS spectra, in the potassium 2p region, of the magnesium anode of FIG. 3B after ten cycles of KSPA electropolymerization (solid line), and of an otherwise equivalent magnesium anode having no protective layer (dotted line). FIG. 4C shows XPS spectra in the magnesium 2p region for the same anodes. The results in FIG. 4B shows substantial potassium peaks for the protected anode and, as expected, no potassium peaks for the unprotected anode. The results in FIG. 4C, in which no magnesium peaks are detectable for the protected anode, suggest that all exposed surfaces of the anode are covered with the polymeric layer when the monomer solution used during electropolymerization is a KSPA solution. Thus, in many implementations, electropolymerized protecting layers of the present teachings will include 3-sulfopropyl methacrylate, whether a potassium salt or another salt thereof.

Figure 5:
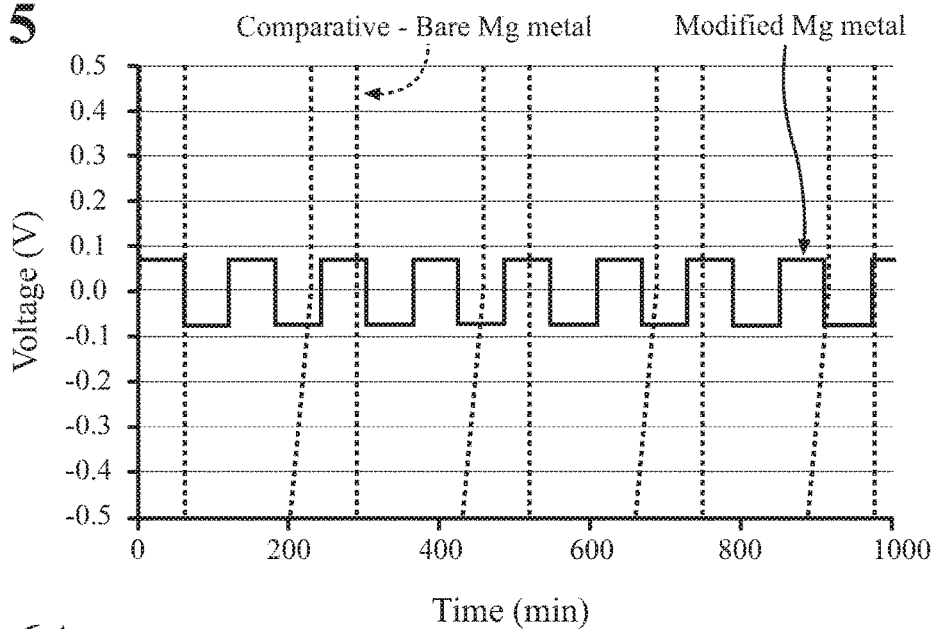
FIG. 5 is a plot of galvanic cycling data for a magnesium cell having a magnesium anode with a protective layer of poly(3-sulfopropyl methacrylate), and a comparative cell having an unprotected magnesium anode.

FIG. 5 shows galvanic cycling of magnesium cell having either: (i) an unprotected magnesium electrode (dotted line) of the type discussed above; or (ii) a magnesium cell having an anode with a poly(KSPA) protective layer (solid line) as produced via electropolymerization of the type shown in FIG. 3B. The galvanic cycling of FIG. 5 is performed in a symmetric cell with an electrolyte of 0.5 M magnesium bis(trifluoromethane)sulfonamide [$Mg(TFSI)_2$] in dimethoxane or acetonitrile solvent.

The y-axis in FIG. 5 is limited to an electric potential range of from −0.5 to 0.5 V, in order to enable viewing of the results for the protected anode. As such, a large portion of the galvanic cycling data are omitted from view. The unprotected electrode goes straight to the potential limits, presumably because the unprotected anode surfaces rapidly become coated with a passivation layer formed from the $Mg(TFSI)_2$ electrolyte solution, the passivation having very poor ionic conductivity. In contrast, the cell having the magnesium anode with a protective layer of electropolymerized KSPA polymer cycles within the expected electric potential window of about +/−0.08 V, indicating that the electropolymerized protective layer adequately prevents formation of the passivation layer and at the same time enables $Mg^{2+}$ migration between the electrolyte solution and the magnesium anode.

Figure 6A:
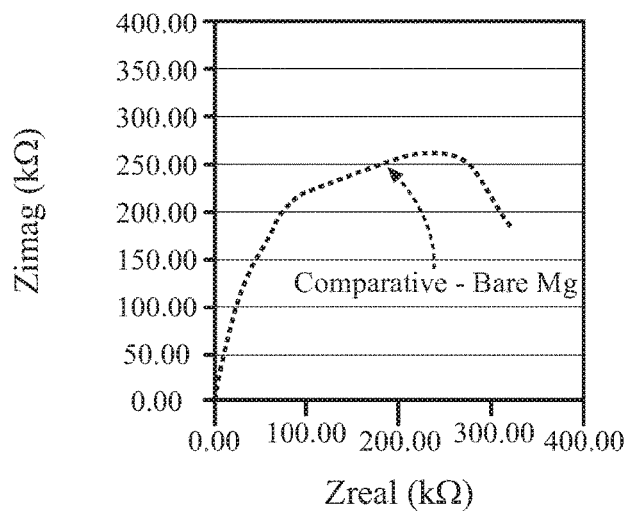
FIG. 6A is an electrochemical Impedance Spectroscopy (EIS) plot of the cells having protected and bare magnesium anode, of FIG. 5.
Figure 6B:
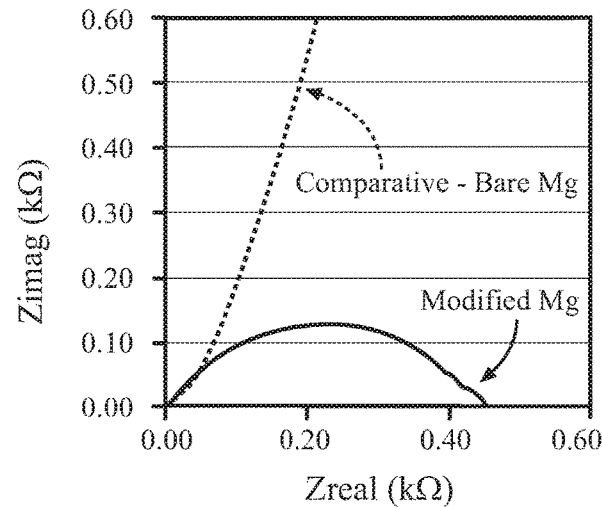
FIG. 6B is a magnified region of the plot of FIG. 6A, enabling a view of the data for the cell having a magnesium anode with a protective layer.

FIG. 6A shows an electrochemical Impedance Spectroscopy (EIS) plot of magnesium cells having unprotected (dotted line) and protected (solid line) magnesium anodes, as discussed above in reference to FIGS. 4A-4C and 5. FIG. 6B shows a magnified portion of the plot of FIG. 6A, to better illustrate the data for the protected electrode. The results show that impedance is dramatically greater at the unprotected anode than at the anode having an electropolymerized protective layer of the present teachings.

Also disclosed is a method for forming a protective layer on a magnesium anode. Magnesium anodes suitable for use with the method can include 3-D magnesium anodes such as a foam magnesium anode discussed above, or a two-dimensional array of protruding magnesium rods, or plates. In some implementations, a magnesium anode suitable for use with the method can include any two-dimensional magnesium anode configuration such as a planar magnesium anode (e.g. foil or a disk anode), a single rod or wire anode, or any other configuration. The method includes a step of contacting all exposed surfaces of the magnesium anode with a monomer solution containing at least one monomer selected from the group consisting of: glycidyl methacrylate (GMA) and a salt of (3-sulfopropyl methacrylate) (SPA). In some implementations, the at least one monomer can include GMA and a salt of (3-sulfopropyl methacrylate); and in some implementations, the at least one monomer can be a salt of (3-sulfopropyl methacrylate).

The method further includes a step of electropolymerizing the at least one monomer in the monomer solution, thereby forming a polymeric protective layer on all exposed surfaces of the magnesium anode. In certain implementations, the electropolymerizing step can be achieved by incorporating the magnesium anode into an electrochemical cell, and exposing the anode to electric potential cycling within one or more electric potential windows. For example, the magnesium anode of FIG. 3A is exposed to electric potential cycling within two electric potential windows: a first cycle window of from about −2.1 V to −4.0 V vs. Ag/Ag$^+$; and a second potential window (for cycles 2-10) of from about −2.1 V to −3.2 V, vs. Ag/Ag$^+$. In some implementations, the at least one electric potential window can include an electric potential window of from about −2 V to −4 V, or smaller, vs. Ag/Ag$^+$. In some implementations, the at least one electric potential window can include an electric potential window of from about −2.0 V to −2.5 V, or smaller vs. Ag/Ag$^+$. It will be understood that when reference is made to an electric potential window within a certain range, or smaller, this includes any smaller electric potential window that could be entirely contained within the explicitly stated window.

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

Example 1: Electrochemical Polymerization (EP)

Electrochemical polymerizations are performed in a Ar-filled glovebox using a three electrode cell with a Mg metal working electrode (8 cm$^2$), an Ag/Ag$^+$ (0.1 M AgNO$_3$) reference electrode, and Pt-mesh counter-electrode. Electropolymerization of GMA is performed with the monomer at 2.0 M concentration in DMF with 0.2 M TBAC. Electropolymerization of KSPA is performed with the monomer at 2.0 M concentration in DMF. For both polymers, they are cycled for 10 cycles. GMA electropolymerization is between open circuit potential and −3.1 V. KPSA electropolymerization is between open circuit potential and −2.4 V.

Example 2: Symmetrical Mg—Mg Cells $\Phi_d$=1.5 cm (SA=1.77 cm$^2$) Mg foil samples are cut in an Ar-filled glove box for symmetrical cell analysis. Foil samples are used in a 2032 coin cell with a borosilicate separator and 0.5 M Mg(TFSI)$_2$/DME. EIS: V=0 mV amplitude, 10 mHz-100 kHz range. Galvanic cycling is +/−0.1 mA/cm$^2$.

Example 3: X-Ray Photoelectron Spectroscopy (XPS)

XPS analysis is performed on a Phi 5600 Spectrometer. Samples are prepared for analysis in loaded under an Ar-atmosphere. The beam diameter is 100 μm.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A protected foam magnesium anode, comprising:
an open cell magnesium foam anode having a surface consisting of magnesium metal; and a polymeric protective layer coating the magnesium foam anode on substantially all surfaces, the polymeric protective layer comprising a polymer selected from the group consisting of:
poly(potassium 3-sulfopropyl methacrylate); and
a glycidyl methacrylate/potassium 3-sulfopropyl methacrylate copolymer.

2. The protected foam magnesium anode as recited in claim 1, wherein the polymeric protective layer comprises poly(potassium 3-sulfopropyl methacrylate).

3. The protected foam magnesium anode as recited in claim 1, wherein the polymeric protective layer comprises a glycidyl methacrylate/potassium 3-sulfopropyl methacrylate copolymer.

4. The protected foam magnesium anode as recited in claim 1, wherein the open cell magnesium foam anode comprises an anode formed entirely of elemental magnesium.

5. The protected foam magnesium anode as recited in claim 1, wherein the open cell magnesium foam anode comprises an anode formed of magnesium plated on a metal foam substrate.

6. The protected foam magnesium anode as recited in claim 5, wherein the open cell metal foam substrate comprises copper foam.

* * * * *